United States Patent
Jackson

(10) Patent No.: US 9,537,726 B2
(45) Date of Patent: *Jan. 3, 2017

(54) SYSTEM AND METHOD FOR PROVIDING THRESHOLD-BASED ACCESS TO COMPUTE RESOURCES

(71) Applicant: Adaptive Computing Enterprises, Inc., Provo, UT (US)

(72) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,346

(22) Filed: Sep. 10, 2015

(65) Prior Publication Data

US 2015/0381436 A1 Dec. 31, 2015

Related U.S. Application Data

(63) Continuation of application No. 13/758,182, filed on Feb. 4, 2013, now Pat. No. 9,135,066, which is a continuation of application No. 11/155,347, filed on Jun. 17, 2005, now Pat. No. 8,370,898.

(60) Provisional application No. 60/581,257, filed on Jun. 18, 2004.

(51) Int. Cl.
| | |
|---|---|
| G06F 7/04 | (2006.01) |
| G06F 17/30 | (2006.01) |
| H04L 12/24 | (2006.01) |
| G06F 9/50 | (2006.01) |
| G06F 9/48 | (2006.01) |

(52) U.S. Cl.
CPC ............ *H04L 41/50* (2013.01); *G06F 9/4881* (2013.01); *G06F 9/50* (2013.01); *G06F 9/5005* (2013.01); *G06F 9/5011* (2013.01); *G06F 9/5022* (2013.01); *G06F 9/5027* (2013.01); *G06F 9/5072* (2013.01); *H04L 41/00* (2013.01); *G06F 2209/504* (2013.01); *G06F 2209/5014* (2013.01); *Y02B 60/142* (2013.01)

(58) Field of Classification Search
CPC .................. H01L 2924/14; H01L 2224/73265; G06F 21/30; H04L 63/08
USPC .......................................................... 726/2
See application file for complete search history.

(56) References Cited

U.S. PATENT DOCUMENTS

| | | |
|---|---|---|
| 6,021,425 A | 2/2000 | Waldron, III et al. |
| 6,098,090 A | 8/2000 | Burns |
| 6,105,122 A * | 8/2000 | Muller .................... G06F 15/17 345/472 |
| 6,324,279 B1 | 11/2001 | Kalmanek, Jr. et al. |
| 6,330,583 B1 | 12/2001 | Reiffin |

(Continued)

*Primary Examiner* — Kambiz Zand
*Assistant Examiner* — Stephen Sanders

(57) ABSTRACT

The invention relates to systems, methods and computer-readable media for controlling access to compute resources in a compute environment such as a cluster or a grid. The method of providing conditional access to a compute environment comprises associating a required service level threshold with a compute environment, associating a service level with a requestor, receiving a request for access to the compute environment from the requestor; and, if the service level of the requestor meets the specified service level threshold, then allowing access to the compute resources. The threshold-based access may be enforced by reservations, policies or some other method.

20 Claims, 4 Drawing Sheets

(56) References Cited

U.S. PATENT DOCUMENTS

| | | | |
|---|---|---|---|
| 6,526,442 B1 | 2/2003 | Stupek, Jr. et al. | |
| 7,020,878 B1* | 3/2006 | Rhee ................. | G06F 9/4881 |
| | | | 718/100 |
| 7,111,297 B1 | 9/2006 | Sankaranarayan et al. | |
| 2002/0120741 A1 | 8/2002 | Webb et al. | |
| 2003/0135609 A1* | 7/2003 | Carlson ............. | G06F 9/5011 |
| | | | 709/224 |
| 2004/0025052 A1 | 2/2004 | Dickenson | |
| 2005/0278760 A1 | 12/2005 | Dewar et al. | |

\* cited by examiner

SYSTEM AND METHOD FOR PROVIDING THRESHOLD-BASED ACCESS TO COMPUTE RESOURCES

PRIORITY CLAIM

The present application is a continuation of U.S. patent application Ser. No. 13/758,182, filed Feb. 4, 2013, which is a continuation of U.S. patent application Ser. No. 11/155,347, filed Jun. 17, 2005, now U.S. Pat. No. 8,370,898, issued Feb. 5, 2013, which claims priority to U.S. Provisional Application No. 60/581,257 filed Jun. 18, 2004, the contents of which are incorporated herein by reference.

BACKGROUND OF THE INVENTION

1. Field of the Invention

The present invention relates to accessing compute resources within a compute environment and more specifically to providing a threshold-based access to compute resources.

2. Introduction

The present invention relates to a system and method of managing access to compute resources in the context of a grid or cluster of computers. Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task.

Grid/cluster resource management generally describes the process of identifying requirements, matching resources to applications, allocating those resources, and scheduling and monitoring compute resources over time in order to run workloads submitted to the compute environment as efficiently as possible. Each project will utilize a different set of resources and thus is typically unique. In addition to the challenge of allocating resources for a particular job, grid administrators also have difficulty obtaining a clear understanding of the resources available, the current status of the grid and available resources, and real-time competing needs of various users.

Several general challenges exist when attempting to maximize resources in a compute environment. First, there are typically multiple layers of grid and cluster schedulers. FIG. 1 illustrates this point. A grid 100 generally comprises a group of clusters or a group of networked computers. The definition of a grid is very flexible and may mean a number of different configurations of computers. The introduction here is meant to be very general. The grid scheduler 102 communicates with a plurality of cluster schedulers 104A, 104B and 104C. Each of these cluster schedulers communicate with a plurality of resource managers 106A, 106B and 106C. Each resource manager communicates with a series of compute resources shown as nodes 108A, 108B and 108C. These may be referred to as a cluster or compute environment 110.

Second, local schedulers (which may refer to either the cluster schedulers 104A, 104B, 104C or the resource managers 106A, 106B, 106C) are closer to the specific resources 108 and may not allow grid schedulers 102 direct access to the resources. The grid level scheduler 102 typically does not own or control the actual resources. Therefore, jobs are submitted from the high level grid-scheduler 102 to a local set of resources with no more permissions that the user would have. This reduces efficiencies.

Third, the heterogeneous nature of the shared resources causes a reduction in efficiency. Without dedicated access to a resource, the grid level scheduler 102 is challenged with the high degree of variance and unpredictability in the capacity of the resources available for use. Most resources are shared among users and projects and each project varies from the other.

Fourth, the performance goals for projects differ. Compute resources are used to improve performance of an application but the resource owners and users have different performance goals: from optimizing the performance for a single application to getting the best system throughput or minimizing response time. Local policies may also play a role in performance Several publications provide introductory material regarding cluster and grid scheduling. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003. The Beowulf Cluster Computing with Linux reference includes steps to creating a cluster.

Given the challenges associated with the compute environment, administrators have difficulty with regards to establishing operating systems and what operating systems are installed within a cluster. In many cases, clusters have a requirement for more than one operating system, such as the Macintosh, AIX, Microsoft NT, Linux, and so forth. The majority of cases, an administrator or a group of administrators or managers will determine before the fact what particular mixture of these operating systems will be needed to be installed on the cluster nodes. In addition to operating systems, the same challenges exists for other resources within the cluster, such as software applications, memory requirements for each node, and other static or semi-static attributes.

These IT mangers and administrators must make a best estimate of the distribution of their workload and then they set up the cluster accordingly. For instance, within a 64 node cluster, an administrator may assign 48 nodes to one operating system, 12 nodes to another operating system, and 4 more nodes to a third operating system. The administrator must anticipate what the workload will be. The problem with this approach as that as the system comes on line, users begin to submit jobs according to their needs and not necessarily what was configured by the operators and managers.

Load balancing issues can immediately exist between the various partitions which exist by virtue of the different operating systems. Partitions may relate to partitioning one of: operating systems, memory, disk space, a software application, a license or some other compute resource. Partitions may also be soft partitions. One may find that the first operating system is under-utilized while the second and third operating systems are heavily over-utilized and there's nothing that can be done about it.

The cluster scheduler 104A, 104B, 104C simply does a matching policy to figure out if a job comes in and requires a particular operating system, and which node or set of nodes are best for running the job. If the scheduler 104A, 104B, 104C attempts but cannot establish matches between jobs and nodes, it queues the job until a match is available when some other job completes. In this regard, the schedulers are basically static systems that do not make fully intelligent decisions regarding work to be processed in the compute environment.

Another challenge in allocating workload to a compute environment is the reservation process. A scheduler will "reserve" compute resources for a user. The reservation of some of the resources places restrictions on the use of those resources such that they will be available for jobs submitted by that user. In other words, a user may reserve, for example, 16 nodes out of the 64 nodes within a cluster for use at 10 am on Tuesday. Having this reservation guarantees that the requestor will have access to those resources at the appointed time. However, by making the reservation, the scheduler to a certain degree ties up those resources and restricts their availability and use for other users. If the requestor then underutilizes those resources, then they are not efficiently used.

What is needed in the art is a way to allow the administrative control over a compute environment to be more flexible in how access is granted to the compute environment such that efficiency can be improved.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention relates to systems, methods and computer-readable media for controlling and providing conditional access to compute resources in a compute environment. The method of providing conditional access to a compute environment comprises associating a required service level threshold with a compute environment, associating a service level with a requestor, receiving a request for access to the compute environment from the requestor; and, if the service level of the requestor meets the specified service level threshold, then allowing the requestor access to the compute environment. The threshold-based access may be enforced by reservations, policies or some other method.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
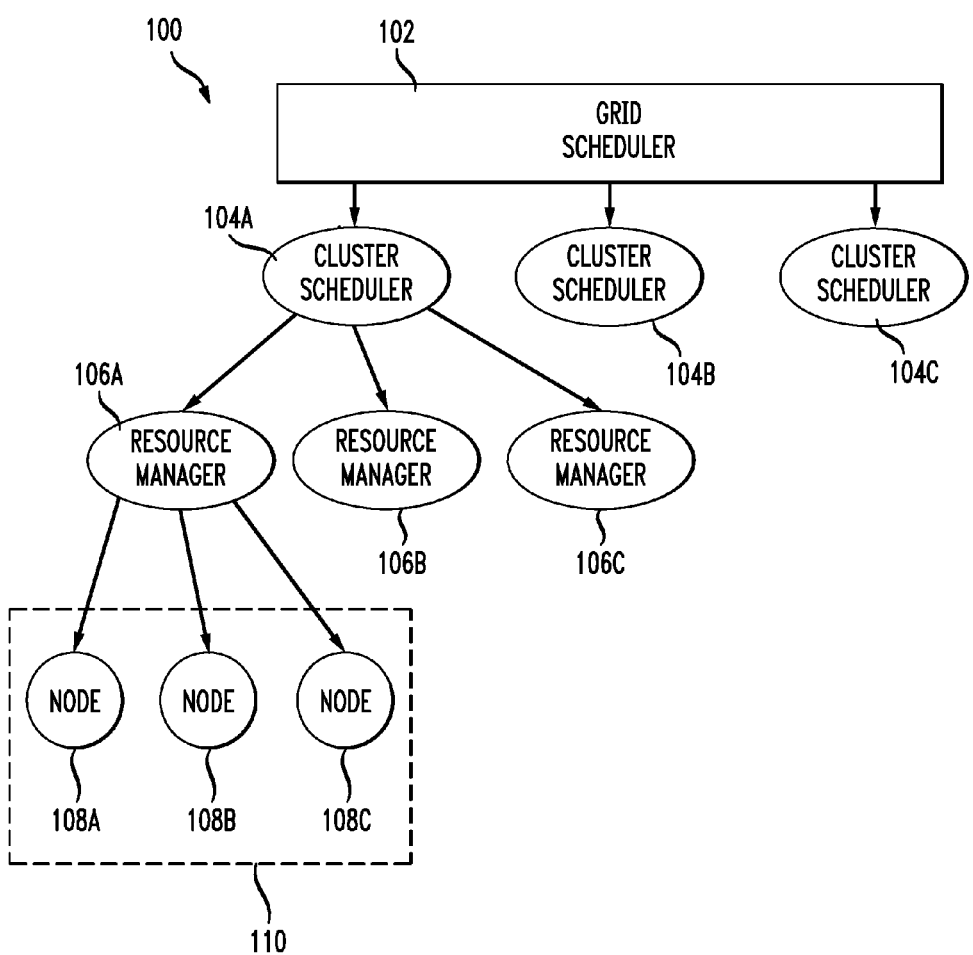
FIG. 1 illustrates a prior art compute environment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention addresses the deficiency in the prior art by providing systems, methods and computer-readable media for providing conditional access to resources or services within a compute environment. The invention enables the system to better satisfy requests for services or resources. The compute environment may be operated by a hosting facility, hosting center, a virtual hosting center, data center, grid, cluster and/or utility-based computing environments and the like. The system aspect of the invention comprises a computing device that operates software that practices the steps of the invention to manage compute resources. The system may further comprise a plurality of computing devices networked together to accomplish the steps of the invention. There are many types of computing devices that are known to those of skill in the art and that are acceptable as the system embodiment of the invention. The computing device may be a single device or a plurality of connected computing devices that enable the invention to be practiced. Typically such a computing device will include the known hardware components such as a central processor or processors, I/O control such as a modem or network card, a bus, memory such as RAM and/or ROM, a display device, and so forth. This and other configurations are contemplated as the hardware utilized in the system embodiment of the invention. The software operating within the system is comprised of computer program modules written in a computing language, such as the C programming language or any other suitable programming language. The programming modules include all the necessary programming to communicate with the compute environment (i.e., such as the cluster/grid) and both receive information about the compute resources within the compute environment and also manage access to, usage of, reserving, servicing and provisioning of those compute resources.

The invention disclosed herein relates to the concept of providing conditional access to the compute environment. The system embodiment of the invention will include the various modules that practice the steps of the method embodiment of the invention disclosed herein. For example, a system for managing compute resources within a compute environment may comprise means for associating a required service level threshold with a compute environment, means for associating a service level with a requestor, means for receiving a request for access to the compute environment from the requestor and means for allowing the requestor access to the compute environment if the service level of the requestor meets the specified service level threshold. The means for performing this may be, as mentioned above, computer programmed modules within a software package that perform these steps and other method steps discussed herein.

Conditional or threshold-based access to a compute environment enables an increased flexibility in the management and use of a compute environment. An example will help to understand the context of the present invention. Assume a compute environment includes 100 nodes or 100 computers networked together. Under a typical management solution, assume that user A reserves 25 nodes, user B reserves 25 nodes and user C reserves 25 nodes. This leaves 25 nodes un-reserved which makes them available for use by the management system.

By providing the management feature of conditional access to compute resources, the administrative software for the compute environment can enable more of the compute resources available for load balancing and optimization. Taking the above example, the software, instead of reserving 75% of the resources for users A, B and C, the system may instead reserve 25% of the resources with conditional access metrics or may simply provide conditional access to resources independent of any reservation. This new approach to providing access to the compute environment improves the ability of the system to improve service level guarantees and targeted delivery of a particular service level. In this approach, user A can have access to what was previously user B's reserved resources; user B can have access to what was previously user C's reserved resources, and so forth.

In the previous manner of reserving resources, there was no way to favor jobs or users based on the level of service they are receiving. The system was much more static in the manner in which it reserved and submitted jobs from a requestor to the compute environment. There was simply no way to target access for maintaining a guaranteed level of service. The guaranteed level of service may relate to a guaranteed number of processors, disk space, access time, workload processing time, and so forth. With the approach of the present invention, the scheduler can load balance and optimize the workload for user A, user B and user C based on priorities or other criteria. This provides more freedom for the scheduler.

In the context of the present invention, the term "cluster scheduler" may refer to a number of managing applications within a computing environment such as a cluster or a grid. For example, this term may apply to a resource manager, a cluster scheduler, a grid scheduler, a workload manager, a cluster or a grid monitor, a cluster manager and so forth. There are a number of software applications in the grid environment that may manage or schedule work at various layers of the network. The term "cluster scheduler" may refer to any of these components at the various layers of a grid or cluster.

A cluster scheduler typically operates on a server and communicates with other nodes via any known network. The basic configuration of cluster and grid schedulers, and their communication means with resource managers and ultimately cluster resources such as nodes are known in the art. Submitting jobs to the compute environment is shown by way of example in FIG. 2. The architecture 200 shown in FIG. 2 includes a compute environment such as cluster 202 having sixteen nodes 224. A job queue 210 currently contains a plurality of jobs 212, 214, 216, 218, and 220. The partitioned operating systems, OS1 204, OS2 206 and OS3 222 are shown. These operating systems each span into multiple nodes 224 of the cluster 202. Assume that there is an over-commitment of resources to OS2 and OS3 as shown by the jobs having been assigned to their respective partitions for processing. In this example, jobs 212 and 214 are each assigned to OS1 204, job 216 is assigned to OS2, job 218 is assigned to OS3 and job 220 is assigned to process in both OS3 222 and OS2 206. The size of the partitions illustrates the relative size and processing power of each of the partitions of operating system. Since OS1 204 is larger, but has the same amount of jobs assigned to it (two), we can assume that OS1 204 has an over abundance of resources in comparison to OS2 206 and OS3 222.

Figure 2:
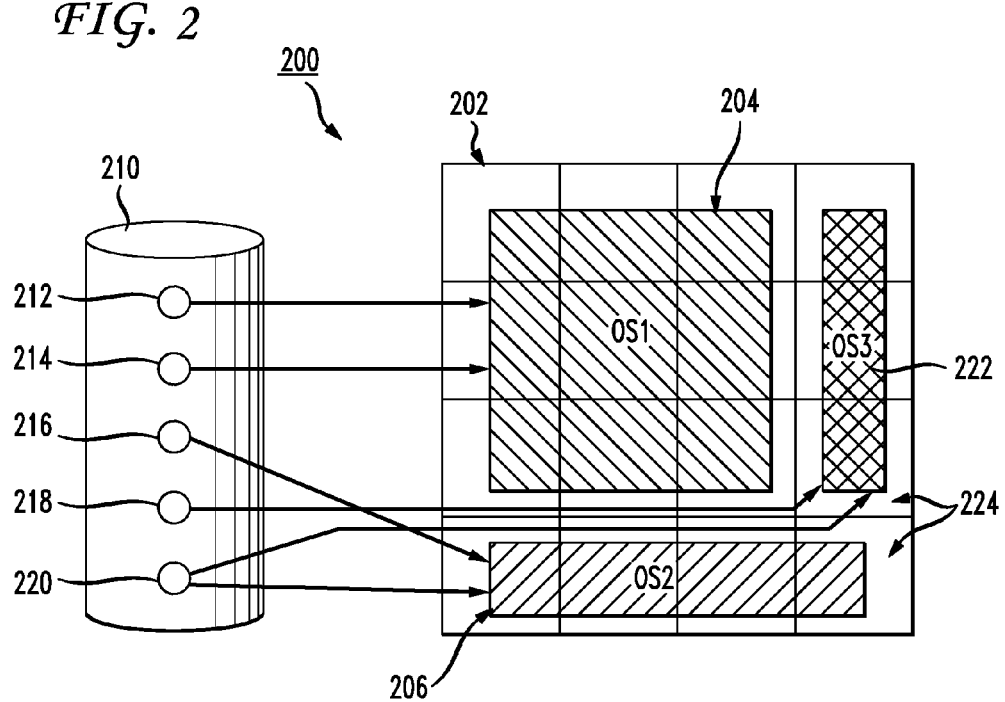
FIG. 2 illustrates a compute environment with an access control list.

Access to the environment in FIG. 2 is shown as a job queue but the conditional access to the compute environment is not limited to just jobs. The requestor who seeks access to the compute environment may be a job or a service request or a credential. Examples of these features include a job that is an analysis of a weather pattern, a service request may be a request to provision a portion of the compute environment with a specific operating system and software package for a particular purpose. Credentials are further discussed below.

Figure 3:
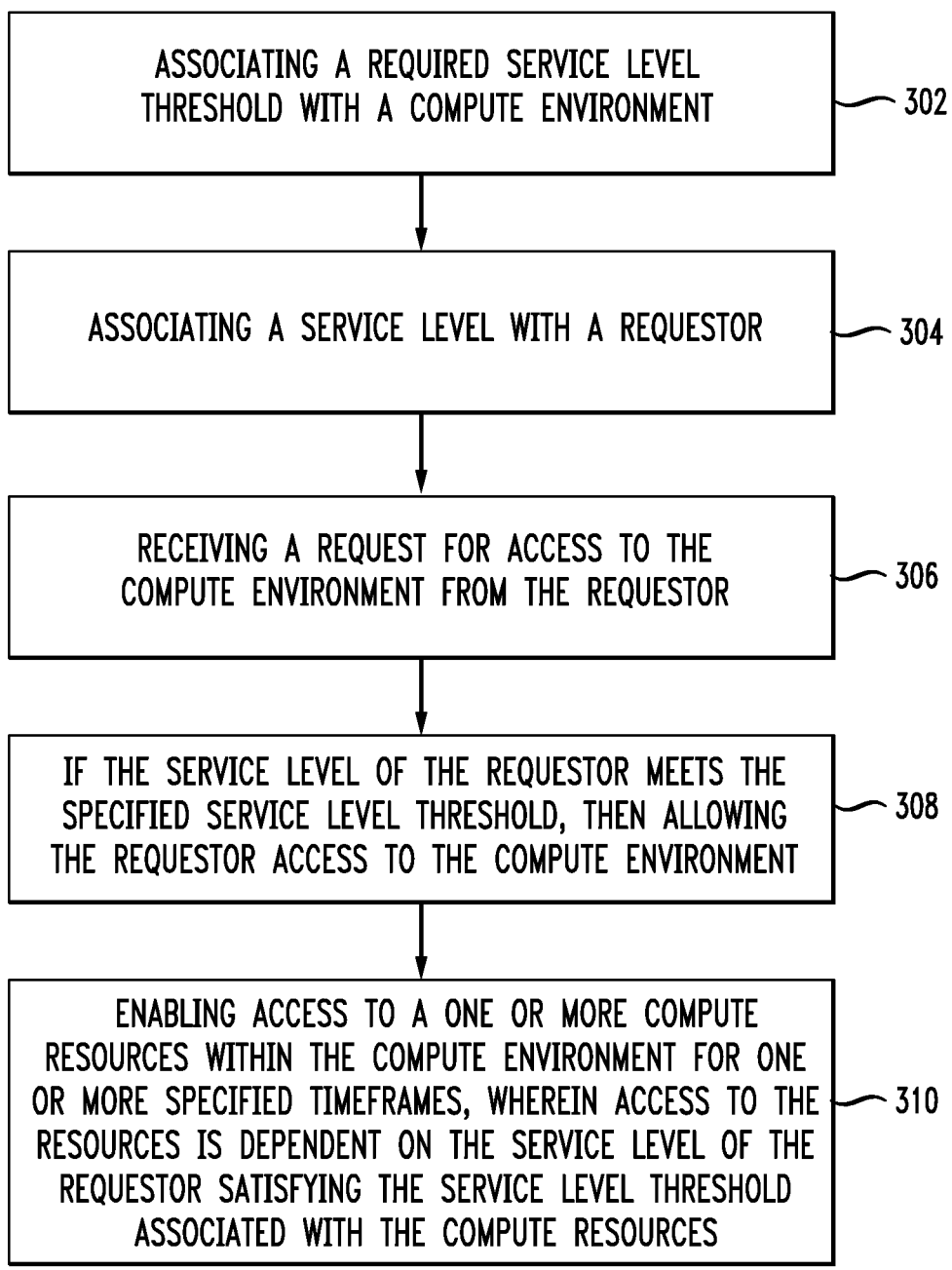
FIG. 3 illustrates a method embodiment of the invention.

In addition to referencing FIG. 2, the method embodiment of the invention will be explained with reference to FIG. 3. The present invention provides conditional access to a compute environment by associating a required service level threshold with a compute environment (302), associating a service level with a requestor (304), receiving a request for access to the compute environment from the requestor (306) and if the service level of the requestor meets the specified service level threshold, then allowing the requestor access to the compute environment (308). The system may then enable access to one or more compute resources within the compute environment for one or more specified timeframes and make the access to the resources dependent on the service level of the requestor satisfying the service level threshold associated with the compute resources (310).

The threshold-based access may be enforced by reservations, policies or some other method. Reserving a node or a plurality of nodes within the compute environment is only one method of enabling or enforcing threshold-based access to the compute environment. For example, in the context of using reservations to enforce threshold based resource access, a resource reservation reserves a subset of compute resources for one or more specified timeframes. One or more access controls are added to the reservation which allows workload to utilize the reserved resources via this control if and only if a specified service level threshold is satisfied. A service level threshold is allowed to be job or credential-based. Examples of this include: where a workload (job) current queue time is >=X; a workload (job) current X factor is >=X; where a job credential (i.e., a user, group, account, etc) average queue time is >=X; a job credential (i.e., a user, group, account, etc) average X factor is >=X; and a job current usage is X (i.e., grant access if user X has less than 16 simultaneously active jobs).

Various features of the invention will be discussed next. The service level threshold may be associated with the compute resources and a timeframe through the use of a resource reservation and resource reservation access control list. Feature 210 in FIG. 2 illustrates an example of an access control list. The service level threshold may be associated with at least one of a job or a credential. A credential may also refer to a political entity such as a home cluster, a user, a group, an account, a class, a remote grid, a remote cluster and so forth. There is a global aspect to a political entity wherein when the control of access to the compute environment is related to the political entity, that control applies whether the requestor is making a resource request or a service request. The control of access in some cases applies whether the requestor is a job, credential of any credential type and all threshold types.

As mentioned above, the "requestor" may be a job, credential or a service request or some other type of request for access to the compute environment. The specified service level threshold may relate to a current estimated or realized queue time, estimated or realized minimum expansion factor, or estimated or realized job throughput. The specified service level threshold for the workload may relate to a parameter that is either met or exceeded (such as number of nodes assigned or an amount of memory assigned), fairshare usage of compute resources, current compute resource utilization or may relate to a responsiveness value for the credential.

If the requestor is a job, the specified service level threshold may relate to responsiveness measured in terms of at least one of: a queue time, an expansion factor or job throughput. If the service level threshold relates to fairshare usage, then the threshold may be associated with one of short term or long term historical information. Each of the above listings is considered an example of the terms discussed herein. Other things may apply as well which will be understood by those of skill in the art.

The specified service level threshold may also relate to current utilization associated with at least one of: active jobs, allocated nodes, allocated processors, allocated processor seconds, bandwidth usage, licensing usage, disk storage usage, a usage parameter, an average of resource usage such as a current job usage or current license usage.

As introduced above, the requestor may also submit a service request in contrast to a workload or job request. This may relate to requesting at least one of: provisioning services, job migration services (such as migrating between clusters), data migration services, reservation creation, priority adjustment, policy and/or limit exemption, preemption services, and access to other compute environment services such as services provided by a database, web server, or an application server. Service requests may be related to a credential such as at least one of: a home cluster, a user, a group, an account, a class, a queue, a quality of service, a remote cluster, a grid and a service level agreement. Other credentials are also contemplated. The specified service level threshold may relate to a measurable metric on a per job or per credential basis where control of access to the compute environment relates to a credential.

The computing device embodiment of the invention provides conditional access to a compute environment by utilizing modules for controlling the computing device as follows: a module configured to associate a required service level threshold with a compute environment, a module configured to associate a service level with a requestor, a module configured to receive a request for access to the compute environment from the requestor and a module configured to allowing the requestor access to the compute environment if the information meets of the requestor the specified service level threshold or a module for allowing the requestor access to the compute environment if the service level of the requestor meets the specified service level threshold. Other modules may be programmed to perform any of the steps discussed herein.

Figure 4:
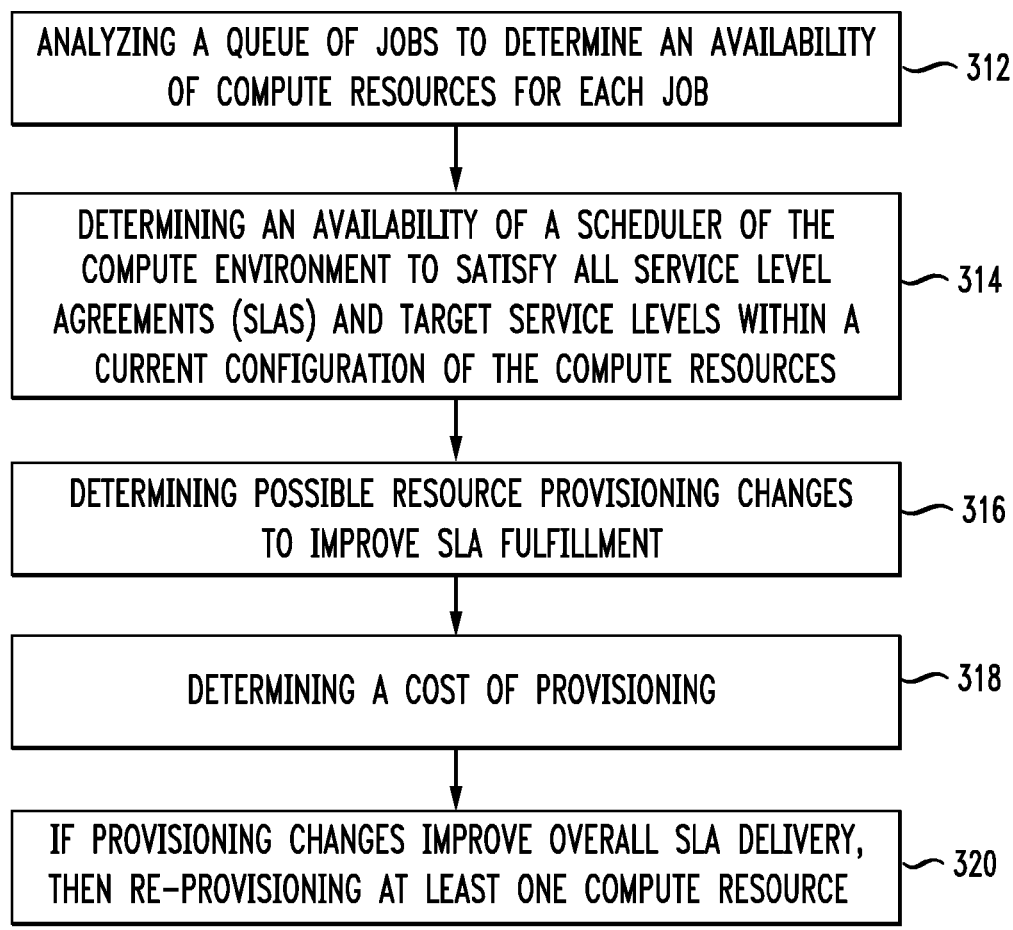
FIG. 4 illustrates another method embodiment of the invention.

FIG. 4 illustrates a method embodiment. The method includes analyzing a queue of jobs to determine an availability of compute resources for each job (312), determining an availability of a scheduler of the compute environment to satisfy all service level agreements and target service levels within a current configuration of the compute resources (314), determining possible resource provisioning changes to improve SLA fulfillment (316), determining a cost of provisioning (318) and, if provisioning changes improve overall SLA delivery, then reprovisioning at least one compute resource (320).

Embodiments within the scope of the present invention may also include transitory or non-transitory computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:
1. A method comprising:
    associating, via a processor, a requestor service level with a requestor, the requestor being separate from a compute environment and the requestor service level being a service level required by the requestor when requesting resources in the compute environment;
    receiving a request associated with the requestor for access to the compute environment;

identifying a second service level, wherein the second service level is a service level offered by the compute environment;
upon determining that the second service level can satisfy the requestor service level, allowing the requestor access to the compute environment; and
upon determining that the second service level cannot satisfy the requestor service level, denying the requestor access to the compute environment.

2. The method of claim 1, further comprising:
enabling access to a compute resource within the compute environment for a specified timeframe, wherein the access to the compute resource is dependent on the second service level is satisfied by the requestor service level.

3. The method of claim 2, wherein the second service level is associated with a timeframe through a use of a resource reservation and a resource reservation access control list.

4. The method of claim 1, wherein the second service level is associated with at least one of workload and a credential.

5. The method of claim 4, wherein the second service level relates to at least one of a current estimated queue time, current realized queue time, estimated minimum expansion factor, realized minimum expansion factor, estimated workload throughput and realized workload throughput.

6. The method of claim 4, wherein the second service level relates to at least one of a parameter that is met and a parameter that is exceeded.

7. The method of claim 6, wherein the second service level relates to fairshare usage of compute resources.

8. The method of claim 6, wherein the second service level relates to responsiveness for the credential.

9. The method of claim 7, wherein the fairshare usage relates to one of short term historical information and long term historical information.

10. The method of claim 8, wherein the second service level further relates to current compute resource utilization.

11. The method of claim 10, wherein the second service level further relates to current utilization associated with at least one of: active workload, allocated nodes, allocated processors, allocated processor seconds, bandwidth usage, licensing usage and disk storage usage.

12. The method of claim 1, wherein the second service level is associated with a usage parameter.

13. The method of claim 12, wherein the second service level is further associated with an average of resource usage.

14. The method of claim 13, wherein the average of the resource usage is associated with current job usage.

15. The method of claim 1, wherein receiving the request for access to the compute environment from the requestor further comprises receiving a service request.

16. The method of claim 15, wherein the service request is for at least one of: provisioning services, workload migration services, data migration services, reservation creation, priority adjustment, policy exemption, limit exemption, preemption services, and access to other multi-node compute environment services.

17. The method of claim 16, wherein the other multi-node computer environment services comprise services provided by at least one of a database, a web server and an application server.

18. The method of claim 16, wherein the service request is related to a credential.

19. The method of claim 18, wherein the credential is at least one of: a home cluster, a user, a group, an account, a class, a queue, a quality of service, and a service level agreement.

20. A computing device comprising:
a processor; and
a computer-readable storage device storing instructions, which, when executed by a processor, control the processor to perform operations comprising:
associating a requestor service level with a requestor, the requestor being separate from a compute environment and the requestor service level being a service level required by the requestor when requesting resources in the compute environment;
receiving a request associated with the requestor for access to the compute environment;
identifying a second service level, wherein the second service level is a service level offered by the compute environment;
upon determining that the second service level can satisfy the requestor service level, allowing the requestor access to the compute environment; and
upon determining that the second service level cannot satisfy the requestor service level, denying the requestor access to the compute environment.

* * * * *